Patented Feb. 20, 1934

1,947,673

UNITED STATES PATENT OFFICE 1,947,673

PROCESS OF PREPARING ESTERS

Heinrich Bertsch, Chemnitz, Saxony, Germany, assignor to the firm H. Th. Bohme, Aktiengesellschaft, Chemnitz, Saxony, Germany No Drawing. Application February 5, 1931, Serial No. 513,793, and in Germany February 10, 1930

6 Claims. (Cl. 260—99.12)

This invention relates to methods of producing esters of sulphated higher aliphatic organic acids which are excellently suitable as treating, purifying and dispersing agents in many branches of industry.

The novel products of the invention are prepared by esterifying and sulphating polybasic higher aliphatic acids. These acids, serving as the initial material, may be obtained in any suitable manner, for example, by reacting hydrogen cyanide with unsaturated fatty acids having one or more double bonds and saponifying the resulting nitrile. Thus, for example, the addition of hydrogen cyanide to ricinoleic acid yields a semi-nitrile of dibasic hydroxy-acid which upon saponification yields a free dibasic acid.

The polybasic or dibasic acid formed by this or any other method may be sulphated and esterified in any order. Either reaction may precede the other or the two reactions may be carried on simultaneously. For example, the acid may first be completely or partly esterified by reacting therewith a hydroxyl derivative of a hydrocarbon including such substances as alcohols of either aliphatic, alicyclic, or aromatic nature and phenol. Then the sulphation may be carried out by treating the ester with any suitable sulphating agent including concentrated sulphuric acid, oleum, chlorosulphonic acid or any mixture thereof. If necessary or desirable, the sulphation may be aided by the presence of organic or inorganic water-retaining substances, especially acids or acid derivatives, and/or by the presence of sulphation catalysts, such for example, as kieselguhr or animal charcoal.

The alcohol or phenol causing the esterification may be added before, during or after the sulphation, to the reaction mixture or to one of its components. The sulphation is preferably carried out at "cool" or "low" temperatures, for instance, below 15° C.

Example

One hundred kilograms of the dibutyl ester of the dibasic hydroxy-acid, $C_{19}H_{36}O_5$, obtained by the reaction of hydrogen cyanide on ricinoleic acid, saponification of the resulting nitrile and esterification with n-butyl alcohol are sulphated at a temperature below 15° C. with 130 kilograms of concentrated sulphuric acid (66° Bé.). After reaction has gone to completion, the mixture is caused to separate by chilling with ice and washing with a saturated solution of Glaubers salt. The product after neutralization in the customary way, is found to be readily soluble in water and ready for use.

The sulphuric reaction product in the foregoing example is thought to have the following formula:

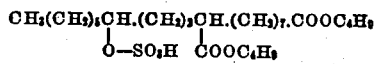

Having thus described the invention, what is claimed as new and desired to be secured by Letters Patent is:

1. The process of producing esters of sulphated higher aliphatic organic acids comprising reacting a polybasic higher aliphatic carboxylic acid containing one or more radicals selected from the group consisting of —CH=CH and OH with a mono-hydroxyl derivative of a hydrocarbon and a sulphating agent.

2. The process in accordance with claim 1 wherein said sulphating agent is selected from the group consisting of concentrated sulphuric acid, oleum, chlorosulphonic acid and any combination of these agents with one another.

3. The process in accordance with claim 1 wherein said treatment is carried out at a temperature below 15° C.

4. The process of producing esters of sulphated aliphatic organic acids comprising esterifying a polybasic higher aliphatic carboxylic acid containing one or more radicals selected from the group consisting of —CH=CH and OH by reacting therewith a mono-hydroxyl derivative of a hydrocarbon and then sulphating said ester.

5. The process of producing esters of sulphated aliphatic organic acids comprising reacting a polybasic higher aliphatic carboxylic acid containing one or more radicals selected from the group consisting of —CH=CH and OH with a sulphating agent and then esterifying the resulting product by reacting a mono-hydroxyl derivative of a hydrocarbon therewith.

6. The process of producing esters of sulphated higher aliphatic organic acids comprising reacting a polybasic higher aliphatic carboxylic acid containing one or more radicals selected from the group consisting of —CH=CH and OH with a mono-hydric substance selected from the group consisting of aliphatic monohydric alcohols and phenol and with a sulphating agent.

HEINRICH BERTSCH.